Dec. 15, 1936. J. D. DURANT 2,064,198
PRESSURE GAUGE
Filed May 24, 1935
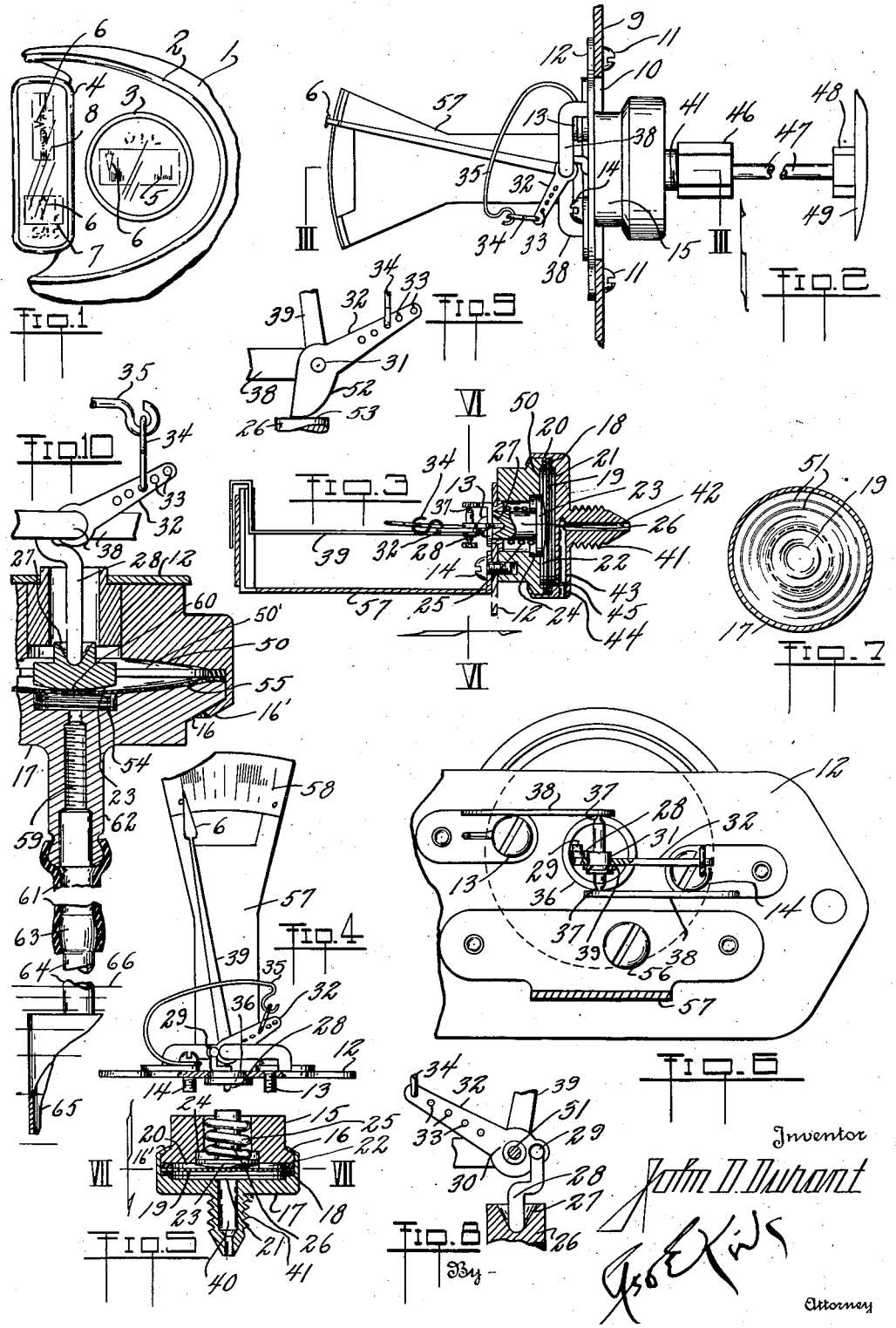
Inventor
John D. Durant
By
Attorney

UNITED STATES PATENT OFFICE 2,064,198

PRESSURE GAUGE

John D. Durant, Adrian, Mich., assignor to Schwarze Electric Company, Adrian, Mich., a corporation of Michigan Application May 24, 1935, Serial No. 23,214

5 Claims. (Cl. 73—110)

This invention relates to indicating instruments.

This invention has utility when incorporated in diaphragm operated means as spring resisted, more particularly as remote control temperature, pressure and volume devices, especially of standardized general structure for a multi-adaptation, as for motor vehicle switch boards in disclosing conditions for fuel level, oil pressure and engine temperature, whether from the block or cooling liquid.

Referring to the drawing:

Fig. 1 is a fragmentary view of an instrument board in a motor vehicle having an embodiment of the indicating mechanisms or gauges of the disclosure herein;

Fig. 2 is a detail view in plan of, say the oil gauge of Fig. 1;

Fig. 3 is a section on the line III—III, Fig. 2;

Fig. 4 is a view of the indicator portion of the device with straightaway scale instead of offset for the pointer;

Fig. 5 is a sectional view of the pressure responsive chamber adapted for vertical positioning and connection with the indicator mounting of Fig. 4;

Fig. 6 is a section on the line VI—VI, Fig. 3;

Fig. 7 is a detail view of the corrugated type of diaphragm in the chamber assembly;

Fig. 8 is a detail view of the linkage and lever to be operated by the plunger;

Fig. 9 is an adaptation of a cam in lieu of the link connection to the lever; and Fig. 10 is a view of a pressure chamber with the calibrating spring on the pressure-receiving side of the diaphragm.

Instrument board 1 (Fig. 1) of an automobile is shown as having panel 2 with windows 3, 4, therein. At window 3 there is shown set of graduations 5 over which may move pointer 6 to show oil pressure as developed in the force feed system for the internal combustion engine. Pointer 6 at scale 7, visible through the window 4 may show the fuel volume or reserve in the tank. Pointer 6 at scale 8 through the window 4 may disclose the temperature of the block or of the water circulating system for the motor. Rearwardly from the windows, plate 9 (Fig. 2) may have opening 10 therein. At this opening 10 there may be assembled by screws 11, plate 12. This plate 12 (Figs. 3, 4) carries additional screws 13, 14, anchored with member 15 (Figs. 2, 5) having ledge 16 (Fig. 5). This ledge 16 is embraced by rim 16' (Fig. 5) of opposing companion member 17 (Figs. 5, 10). This member 17 has seat for gasket 18 against which is located diaphragm 19. Opposing gasket 20 may seat between this diaphragm 19 and the member 15 in having the rim 16' pressed into fixed assembly relation with the member 15, thereby completing the diaphragm-carrying portion of this housing in providing pressure chamber 21 on one side thereof, and on the opposite side, chamber 22 in which is located plunger having head 23 movable at thrown position of the diaphragm 19 to seat at ledge 24.

Substitutive spring 25 is a calibrating spring tending to engage the head of the plunger 23 and thrust such against the diaphragm 19. Stem 26 from this head 23 of the plunger may have seat 27 therein to be engaged by link 28 having offset to pivotal connection 29 (Figs. 4, 6, 8, 10) with lever 30 having fulcrum 31. From this lever 30 extends arm 32 with series of openings 33 therein. There is thus constituted an adjustable feature for this lever in that link 34 may engage different ones of these openings 33 and have connection with spring 35, anchored at one of the screws 13 or 14. This adjustment is available for controllably introducing resistance of the spring 35 for holding the effective action of the link 28 to shift the pointer 6 in a proper range as to the scale.

Thus there is an effective recovery for this lever and link normally holding the link 28 into the seat 27. Surrounding this stem 26 of the plunger is collar 36 fixed with the plate 12, thus retaining this calibrating spring 25 in the member 15 as the screws 13, 14, assemble the plate 12 with this chamber housing. It is therefore seen, to change the pressure under which the device is to operate, it is only necessary to back off the screws 13, 14, and have accessible the spring 25 for removal and replacement by a desired spring.

The fulcrum 31 has point termini 37 as bearings in brackets 38, assembled with the plate 12 by the screws 13, 14. Frictionally mounted on this staff or fulcrum 31 is arm 39 of the pointer 6.

The pressure chamber 21 (Fig. 5) is shown when the diaphragm 19 is in horizontal position as having passage 40 thereto. External threaded portion 41 affords assembly connection for a duct in transmitting the fluid medium for the pressure reaction in the chamber 21.

In instances wherein the diaphragm is away from a horizontal position, it is important that the chamber 21 (Fig. 3) be self-drained as the reflex operation occurs. To this end the externally threaded portion 41 may have duct 42 therein, short of extending directly to the chamber 21, and from this duct 42 there may be radial passage 43 having external plug 44 adjacent port 45 in the lower portion of the chamber 21. Thus as liquid or condensation may develop in the chamber 21, it may be drained back from this housing to the remote source. Union 46 may connect duct 47 from the remote device as fitting 48, say at the internal combustion motor 49.

Herein for wide ranges of installations and uses, there may be standardized in the production, the lever device or pointer and scale, even for say ammeter or electrical actuation. However hereunder, primarily, this device is designed for assembly with a diaphragm type of pressure chamber and is of such general structure that even as designed for disclosing low pressure, there is no hazard of wrecking the structure with many-fold greater pressure actions, in that the plunger-receiving chamber 50 (Fig. 10) toward which the flexed diaphragm is directed has conforming side 50 and the plunger head 23 at the thrown position provides a symmetrical seat for the flexed diaphragm. The diaphragm, in instances when of metal, may have annular corrugations 51 (Fig. 7).

There may be occasion to have the throw of the pointer 6 such as to be a minimum in certain portions or a maximum at a desired region, and to this end cam 52 (Fig. 9) may be fixed with the lever arm 32 and coact with flat terminus 53 of the stem 26. The frictional mounting of the arm 39 on the staff 31 readily permits shifting of this arm relatively to the staff in locating the pointer at the reading positions consistent with the calibrating spring 25. Substitute notations may be placed on the scale in the proper range adopted for the strength of the spring. In the low pressure transmissions such as for tank volume of fuel, the plunger 23, 26, may have its sensitivity enhanced by spring 54 on the side of the diaphragm 19 to hold the diaphragm toward the plunger, and in this instance it may be fabric diaphragm 55.

The direction of throw for the arm 39 may be readily reversed by merely transferring the staff 31 (Fig. 6) end for end and hooking up the spring 35 (Figs. 2, 4) to conform thereto. Screw 56 in the plate 12 may mount bracket 57 as an upright for locating graduations 5, 7, 8, as may be desired with the pointer 6 offset, or according to the location, even not offset for coacting with scale 58.

As suggested, the pressure line to the chamber may be for high or very low pressure and in the instances involving motor vehicle use wherein there is vibration, peculiarly acute in the floating power assembly, a duct of small outside diameter may be adopted even for the lowest pressures, as fuel level, with internal thread 59 (Fig. 10) at the housing portion 17 for anchoring such duct.

Head 23 desirably has its portion 60, remote from the fulcrum 31 supporting the pointer 6, convex.

While the device herein is adapted for a wide range of pressures from, say an inch of water up to fifteen inches in one scale range, or with a substitute spring, from five pounds to two hundred fifty pounds, the flexed portion of the diaphragm as receiving the pressure desirably under the higher regions is conforming to concave portion 50. There is not such importance as to the configuration of the reverse side or pressure-receiving chamber for the strain on the diaphragm is not normally flexed theretoward. The diaphragm proper is relatively more sensitive at its central portion and thus the convex portion 60 is more nicely responsive to the minor changes.

Installation utility, especially under conditions of hydrostatic measurement from a remote point, is had herein by introducing collapsible hose section 61 between stem 62 and coupling 63, say on copper duct 64 extending from bell 65 as submerged, say in fuel tank having fuel liquid 66. In this set up the collapsible hose section or tube 61 may, before connection to the stem, receive a blow of air not only to clear the line 64 but bell 65 of liquid rising therein, and this to the extent of spilling fluid from the bell 65 to rise as bubbles through the fuel 66. The duct 61 may then be collapsed as a closure, like a valve, and connected to the stem 62. There is thus in a substitutive installation or even in a new installation, an immediate direct response for the indicator as to the liquid 66 to be measured. This is of great value in substitutive installations or even in initial installations for the indicating instrument is at once ready to function properly. This feature is of importance in the device as an accessory and accordingly is another feature beyond that of the substitutive spring in adapting the device for wide range of installations either as to accessory or in production.

However, in the offset of the member between the fulcrum and stem it is concentric and the angular relation for the mounting of the pointer is thus independent. The frictional anchoring of the pointer with its fulcrum having the range of adjustment is primarily availed of at installation and anchoring may then occur by riveting or even a shellac coating.

It is to be understood that in hydrostatic gauges, small internal diameters for the ducts so reduces the air volume that temperature change is a less disturbing factor. Small internal diameter for the duct is of importance even in the high pressures of the oil gauge. The diaphragm is not left in thrown position for the spring insures that the position of rest is that of the inactive or no pressure position at zero or atmosphere even with the oil cold or viscous. The small duct or tube has less danger of breakage from vibrations or movements such as those incident to floating power.

What is claimed and it is desired to secure by Letters Patent is:

1. A housing providing a fluid pressure inlet port, a corrugated diaphragm wall in said housing to form a partition opposed to said port, a plunger directed by said housing to seat against the diaphragm opposite the port, a calibration spring directly acting between the plunger and the housing to direct the diaphragm toward the port, there being a seat in the plunger, a stem having one end extending in said seat, a lever to which the other end of the stem is pivoted, a pointer connected to be thrown by the lever, said lever having an arm with a series of openings therein, a re-setting spring for adjustable connection with one of said openings in said arm, and cooperative disclosing scale means for the pointer.

2. A measuring device comprising a housing for receiving pressure, a diaphragm wall in said housing, a stem in said housing and there thrust by said diaphragm, a closure plate having an opening to the stem, a scale mounted on the plate and extending outward adjacent the opening, a pointer movable over the scale, spring means for re-setting the diaphragm wall at idle position upon the absence in the housing of the pressure to be disclosed, longitudinally rigid transmission means pivoted to the pointer, and extending through the closure plate opening and rockably seated at the stem, and independently operable additional leaf spring means mounted on the closure adjacent the opening for re-setting the pointer and causing said transmission means to follow the diaphragm wall.

3. A housing providing a fluid pressure inlet port, a corrugated diaphragm wall in said housing to form a partition opposed to said port, a plunger directed by said housing to seat against the diaphragm opposite the port, a calibration spring directly acting between the diaphragm and wall adjacent the port, there being a seat in the plunger, a stem having one end extending in said seat, a lever to which the other end of the stem is pivoted, a pointer connected to be thrown by the lever, said lever having an arm with a series of openings therein, a re-setting spring for adjustable connection with one of said openings in said arm, and cooperative disclosing scale means for the pointer.

4. A measuring device comprising a scale, a lever pointer pivotally anchored to provide a fulcrum for its movement relatively to the scale, a medially-offset longitudinally-rigid member pivotally connected with the pointer eccentric of the fulcrum, a stem toward the fulcrum having a seat, said member in the seat and as protruding therefrom extending directly toward the fulcrum, said stem having a head away from the fulcrum, and a pressure responsive diaphragm independently of and contacted by said head, there being guide means for the stem spaced from the diaphragm and a spring for resisting movement of said diaphragm when actuated by fluid pressure.

5. A measuring device comprising a scale, a pointer pivotally anchored for movement relatively to the scale, a medially offset member pivotally connected to the pointer eccentric of the fulcrum, a stem toward the fulcrum having a seat into which the member protrudes, said stem having a head away from the fulcrum, a pressure responsive diaphragm contacted by said head, a guide for the stem having a shoulder, and a substitutive spring between the shoulder and head for urging the head toward the diaphragm and away from the fulcrum.

JOHN D. DURANT.